(12) United States Patent
Mercier et al.

(10) Patent No.: US 6,642,454 B2
(45) Date of Patent: Nov. 4, 2003

(54) ELECTRICAL WIRING HARNESS GUIDING AND RETAINING DEVICE

(75) Inventors: Jacky Mercier, Bonnee (FR); Jean-Charles Vial, Bonnee (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 10/096,060

(22) Filed: Mar. 12, 2002

(65) Prior Publication Data

US 2002/0166692 A1 Nov. 14, 2002

(30) Foreign Application Priority Data

Mar. 14, 2001 (FR) .......................................... 01 03 448

(51) Int. Cl.$^7$ ................................................ H01B 7/00
(52) U.S. Cl. .................. 174/72 A; 174/135; 174/72 R; 174/72 C
(58) Field of Search .............................. 174/72 A, 135, 174/72 R, 72 C

(56) References Cited

U.S. PATENT DOCUMENTS

| 3,630,564 A | | 12/1971 | Ferrara |
| 3,949,457 A | * | 4/1976 | Fortsch ........................ 29/755 |
| 5,046,766 A | | 9/1991 | Lomberty et al. |
| 5,556,059 A | * | 9/1996 | Maeda et al. .................. 248/49 |
| 5,957,702 A | * | 9/1999 | Nagai et al. ................... 439/34 |
| 6,031,184 A | | 2/2000 | Ichikawa et al. |
| 6,069,319 A | * | 5/2000 | Davis, Jr. et al. ......... 174/72 A |
| 6,087,593 A | | 7/2000 | Skipworth et al. |
| 6,126,123 A | | 10/2000 | Yang |

FOREIGN PATENT DOCUMENTS

| EP | 0 791 494 | 5/1998 |
| EP | 0 780 616 | 5/1999 |

OTHER PUBLICATIONS

French Search Report dated Nov. 21, 2001.

* cited by examiner

Primary Examiner—Dean A. Reichard
Assistant Examiner—Jinhee J. Lee
(74) Attorney, Agent, or Firm—Carlson, Gaskey & Olds

(57) ABSTRACT

A device for guiding and retaining electric cables in a vehicle includes a first part with a cable guide channel and a second part with a cable retainer that retains the cables in the guide channel. The first part guides cables in a desired direction while the second part allows cables to be retained inside or extracted from the guide channel. The second part compresses the cables placed in the guide channel against the first part. The device also includes a securing means to connect to the vehicle. The second part compresses the cables placed in the guide channel against the first part. The device also includes a securing means to connect to the vehicle.

11 Claims, 4 Drawing Sheets

Fig.4
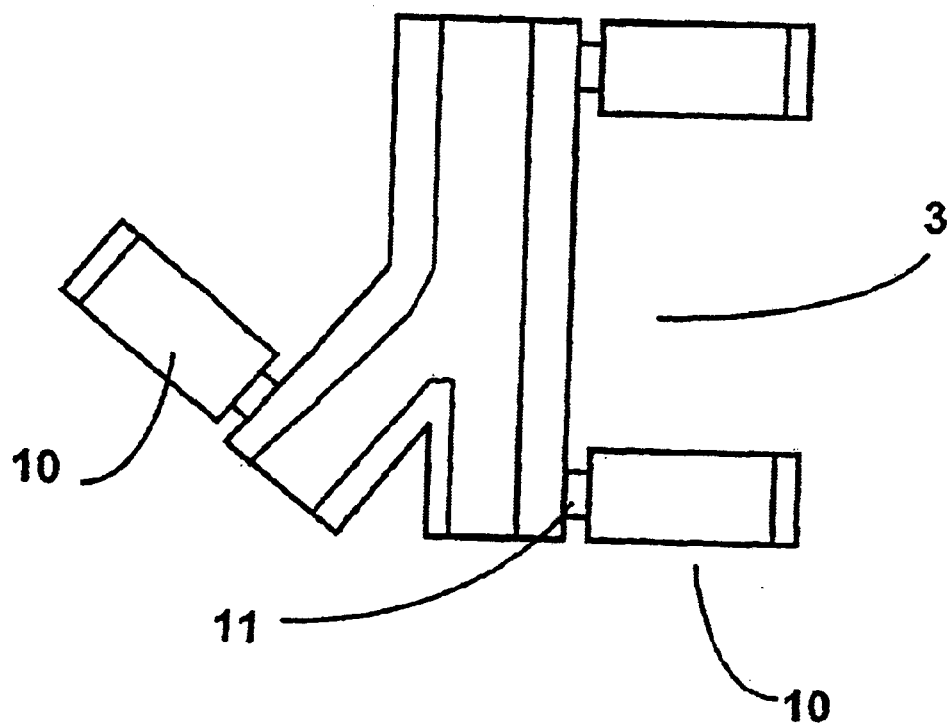
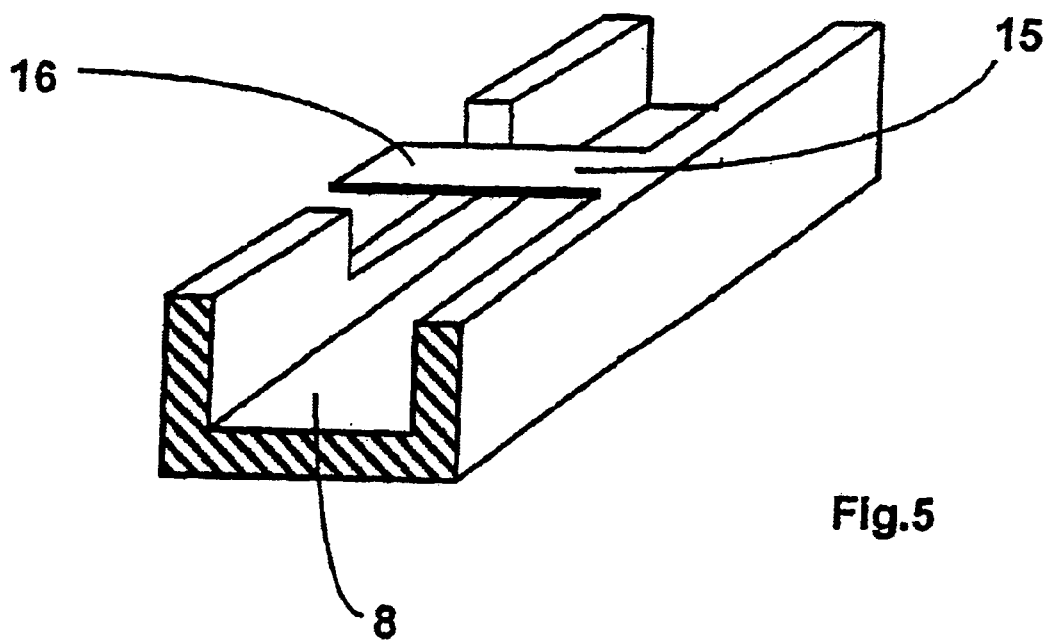
Fig.5

ELECTRICAL WIRING HARNESS GUIDING AND RETAINING DEVICE

BACKGROUND OF THE INVENTION

The present invention relates to a device for guiding and retaining electric cables in a vehicle.

The use of clips and hooks is known for securing electric cables to vehicle bodywork structures. The hooks are placed at different points hi the body and the operator inserts the electric cables into the hooks. The operator needs to know the exact cable path for correctly locating the hooks and the wiring. The system additionally requires all the hooks to be replaced successively, which leads to significant assembly time wit a high risk of error.

The use of plastic ties which encircle the wiring harness for keeping various cables in place is also known. However, this system does not allow wiring harnesses to be secured to vehicle bodywork.

European Patent Application 0,791,494 discloses a system for guiding and retaining a cable harness. This system comprises a flexible plastic retainer, which allows the wiring harness to be guided throughout its path. The wiring harness is located between the flexible retainer and a sheet that is added to and bonded onto the support. However, this device is difficult to put into place in the vehicle. Additionally, the presence of a defective cable or a wiring fault requires the whole harness to be changed.

U.S. Pat. No. 6,031,184 discloses a system for retaining a wiring harness between a guide having the desired harness and a plastic foil welded onto the guide. However, the presence of a defective cable or a wiring fault requires the whole harness to be changed. Additionally, the plastic foil has a shape larger than the shape of the harness. This system consequently occupies considerable bulk. Further, the device is unsuitable for three-dimensional wiring harnesses.

These devices additionally are a source of noise while the vehicle is moving or when one part of the vehicle is moved, for example when a door is being closed.

SUMMARY OF THE INVENTION

There is consequently a need for a cable guide that resolves one or several of these problems.

More precisely, this invention provides an electric cable guide for automobile vehicles, comprising:
- a first part having a guide channel for cables, at least one branch being provided in the channel;
- a second part adapted to selectively retain cables in the guide channel, and allow the cables to be released from the guide channel;
- a fastening means provided in the first or second part allowing said part to be rendered integral with an automobile vehicle.

Preferably, the second part compresses the cables placed in the channel against the first part.

The first or the second part is preferably provided in a vibration-absorbing material.

The second part preferably has substantially the same dimensions as the first part.

The second part preferably also comprises a leaf spring projecting from the channel.

The first and second parts are preferably hinged together by means of a hinge.

In a preferred embodiment, the guide comprises a means for locking the first and the second parts together in a retaining position.

A wiring harness is also provided, comprising:
- at least two separate guides comprising a first part having a cable guide channel, at least one branch being provided in the channel, a second part adapted for retaining cables in the guide channel, the second part compressing cables placed in the channel against the first part, fastening means being provided in the first or second part adapted for rendering that part integral with an automobile vehicle;
- a plurality of electric cables, each cable passing through at least one of the guides and being retained in a channel of the first guide part by the second guide part.

In one embodiment, the second part is additionally adapted to allow the cables to be selectively released from the guide channels.

The first or second part is preferably provided in a vibration-absorbent material.

The second part preferably has substantially the same dimensions as the first part.

The second part preferably also has a leaf spring projecting from the channel.

The first and second parts are preferably hinged together by means of a hinge.

In one embodiment, the guide further comprises a means for locking the first part to the second part in a retaining position.

The invention also provides a method for producing an electric wiring harness, comprising the steps of: retaining on an assembly surface at least two separate guides comprising a first part having a cable guide channel, at least one branch being provided in said channel, a second part adapted for retaining cables in the guide channel and compressing cables placed in the channel against the first part, fastening means provided on the first or second part, adapted to render this part integral with an automobile vehicle; placing a plurality of cables in the channel of the first guide part; acting on the second part of the guides for retaining cables in the guide channel; and removing the guides from the assembly surface.

The invention also provides a kit comprising: at least one cable guide having: a first part with a straight cable guide channel; a second part adapted to selectively retain cables in the guide channel and allow the cables to be released from the guide channel; fastening means provided in the first or second part, designed to render this part integral with an automobile vehicle; a first guide according to the invention with a T-shaped channel, a second guide according to the invention with a Y-shaped channel, and a third guide according to the invention the channel thereof having a shape symmetrical with that of the channel of the second guide.

Further characteristics and advantages of the invention will become more clear from the description which follows of some embodiments, provided by way of example and with reference to the attached drawings.

BRIEF DESCRIPTION OF THE DRAWINGS

FIG. 4 is a top view of one alternative embodiment of the guide.

FIG. 5 is a perspective view of part of the guide according to a further embodiment.

DETAILED DESCRIPTION OF PREFERRED EMBODIMENTS

The invention provides a guide for retaining and orienting cables in a vehicle. This guide has a first part with a guide channel for the cables and a second part which retains the cables in the guide channel.

Figure 1:
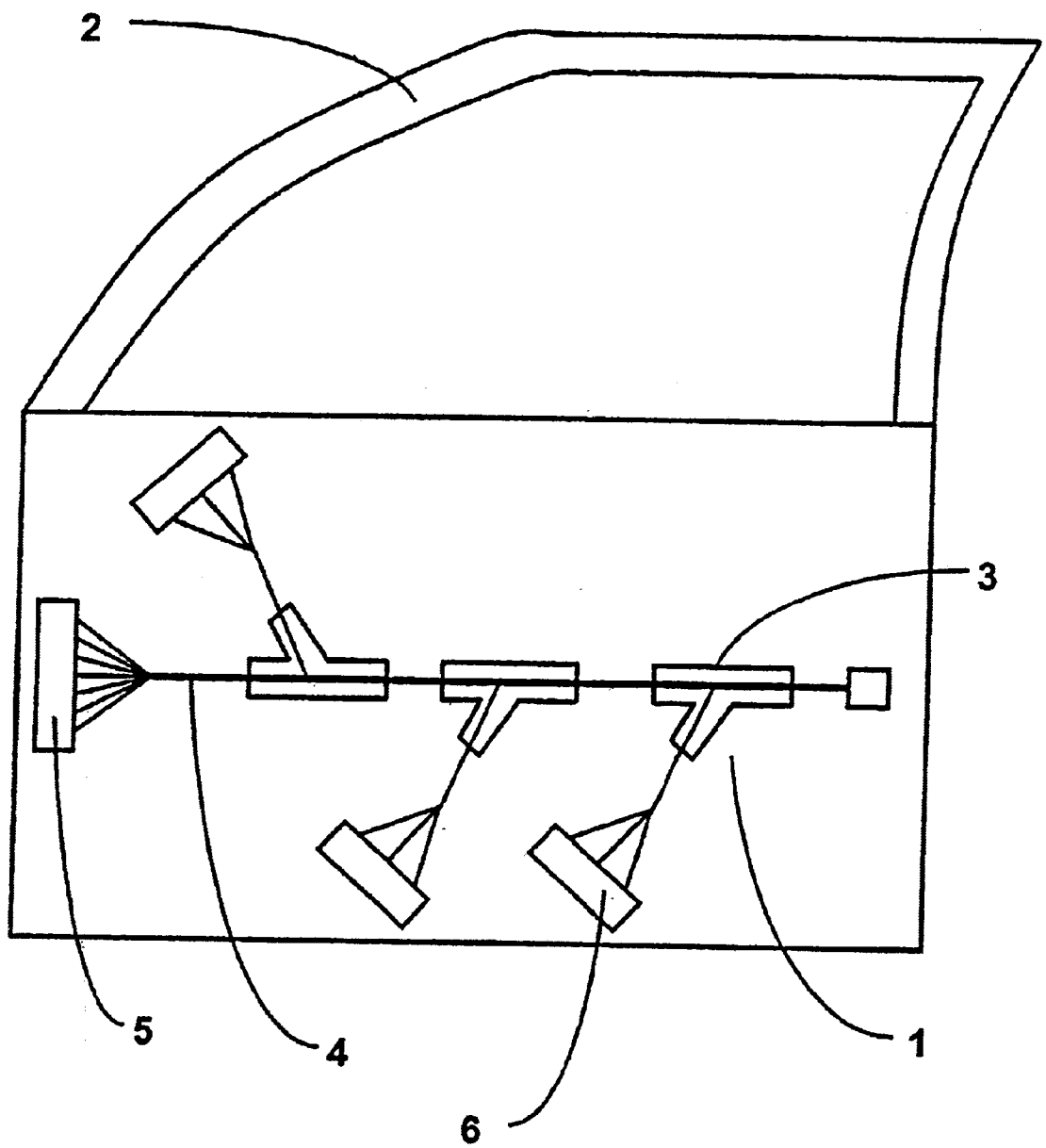
FIG. 1 is a diagramatic view of a wiring harness according to the invention, connected to some peripherals.

FIG. 1 shows a wiring harness 1 mounted on a vehicle door 2. Wiring harness 1 comprises guides 3 and electric cables for passing through these guides. These cables are connected to connectors 5 or peripherals 6, such as loudspeakers, a windshield wiper motor or a lamp.

Figure 2:
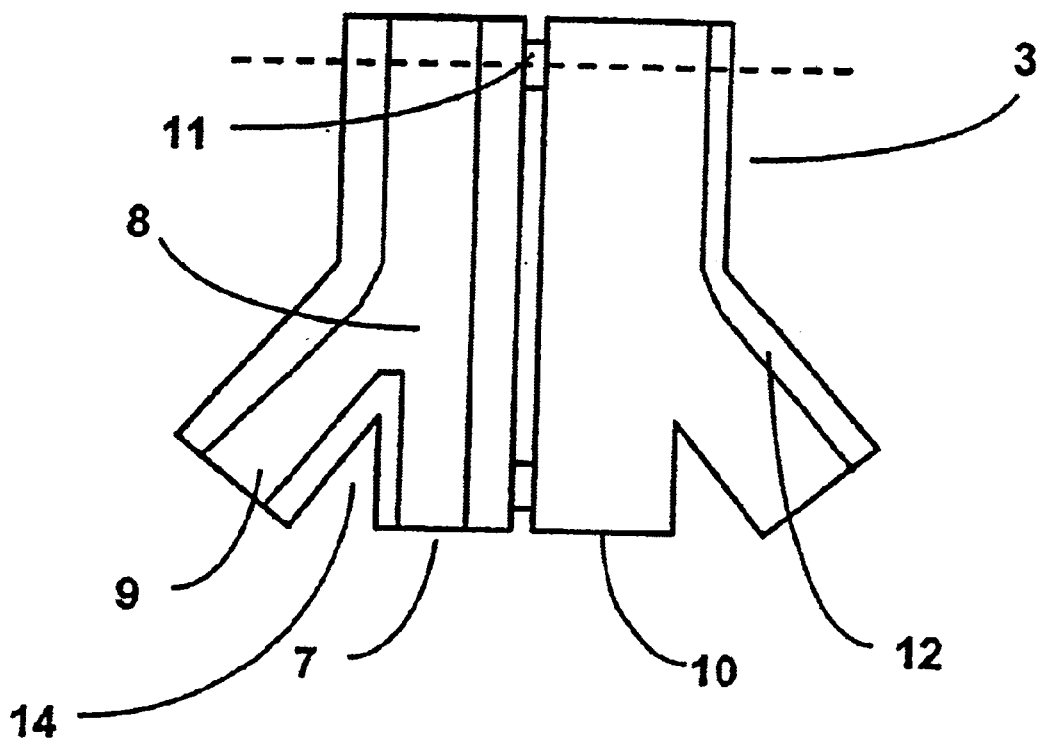
FIG. 2 is a top view of an electric cable guide.
Figure 3:
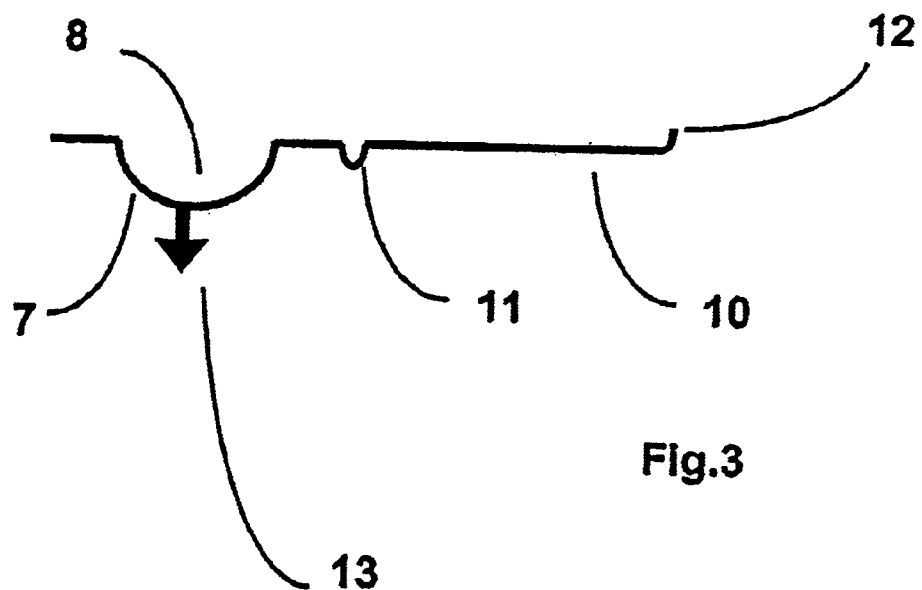
FIG. 3 is a cross section through the cable guide of FIG. 2.

FIGS. 2 and 3 show a cable guide 3 in the open state. The cable guide comprises a first part 7, having a cable guide channel 8. This channel ensures cables placed in the channel are retained laterally. A branch 9 is provided in guide channel 8 for orienting cables towards appropriate parts of the electric circuit. The first part 7 preferably has a recess 14 between the various guide channel branches. The bulk and weight of the guide are consequently reduced.

The guide 3 also comprises a second part 10 responsible for retaining cables in the guide channel 8. This second part 10 allows the cables to be releasably retained. Retaining part 10 can, for example, be connected to the guiding part with a hinge 11. Further, the retaining part can be connected by a hook 12 which locks onto an edge of guiding part 7 at the other side of hinge 11. Thus, a user can selectively retain the cables inside guide channel 8, or release the cables from the channel. An operator can now modify a possible incorrect arrangement of a cable in the harness. It is not necessary in this case to change the whole wiring harness in the case of an error. Similarly, a clip can be provided on the retaining part, which co-operates with a seat of the guiding part for retaining the cables in the guide channel. One can also arrange for part 7 and part 10 to be welded or bonded at a respective end, opposite the hinge 11. The use of a hinge 11 between guide part 7 and retaining part 10 allows guide 3 to be more readily handled before passing cables through the guide channel 8. As shown in FIG. 2, the retaining part preferably has a projected shape that has a similar shape and/or dimension as the guiding part. This ensures better retaining of the cables in the channel.

According to an alternative embodiment shown in FIG. 4, several retaining parts 10 are used, each able to be hinged on guiding part 7 by one or several hinges 11. This reduces the weight of the guide. One can also thus selectively release electric cables to manipulate selected cables without undoing the whole harness.

The guide can have securing means 13 to a vehicle. In the embodiment shown in FIG. 3, one or several clips mounted on the guide part are used, which are secured onto the vehicle. One can, for example, insert a deformable clip of the guide into a passage provided in the vehicle bodywork.

In a further embodiment shown in FIG. 4, the retaining part is a leaf spring 15 having flexible free portions 16 projecting from a portion of cable 8 and retaining the wiring harness in the channel in the rest position. It is possible to place cables in the channel by a spreading spring 15, causing a free portion 16 to bend. When the free portion 16 is released, a restoring force brings the free portion 16 into position and retains the cables in the channel. The spring 15 can also exercise a force on the cables passing through the channel in order to compress them against the first part 7. A suitable compression force makes it possible to prevent axial movement of the cables with respect to the channel. In one alternative embodiment, several springs 15 arc placed along channel 8 for better retention of cables in the channel.

The guide can, for example, be made by molding the two parts separately or by molding them as a one-piece construction. One can, for example, provide the guide in FIGS. 2 and 3 by molding the parts 7 and 10 and the hinges 11 as one single part. The guide is advantageously made of POM, polyacetal or polypropylene. Using these materials makes it possible to absorb vibrations and thus limit undesirable noise generated by cable or guide movement.

The guides are preferably mounted at suitable positions in the wiring to ensure easy mounting of the wiring harness in the vehicle.

One can thus Loin a wiring harness comprising several separate guides. As shown in FIG. 1, each cable passes through at least one of the guides and is retained in the guide channel of the first part by the second part. The guides are preferably located at suitable positions on the wiring which allows them to be secured at corresponding locations in the vehicle.

The invention also provides a method for producing an electric wiring harness. In the method, several independent guides such as described above are placed and retained on an assembly surface. Next, a plurality of cables are inserted in the channel of the first guide part. The second guide part is now operated on to retain the cables in the guide channel, after which the guides are removed from the assembly surface.

Figure 6:
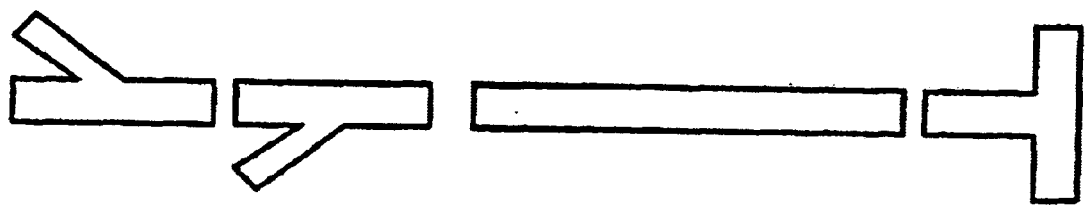
FIG. 6 is a top view of the channel shapes for several guides in the kit.

The invention further provides a kit of guides. The kit advantageously comprises several guides having various channel shapes. This kit can for example include a straight length of guide without branching. Such a guide which is straight enables cables to be guided and retained over a significant length. The kit can also comprise one or several guides having a Y-shaped channel, similar to the guide in FIGS. 2 and 3. The kit can for example include two Y-shaped guides having symmetrical channels. The use of guides with branches on opposite sides allows cables to be directed towards opposite areas of the harness. One can for example use a guide having a T-shaped channel. As shown diagrammatically in FIG. 6, the kit can include a straight guide, a T-shaped channel guide and two symmetric guides with a Y-shaped channel.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An electric cable guide for automobile vehicles, comprising:
   a first part having a guide channel for cables, at least one branch being provided in the guide channel;
   a second part selectively retaining said cables in the guide channel and allowing the cables to be released from the guide channel, the second part compressing cables placed in the guide channel against said first part; and
   a securing means provided in one of the first and second parts to connect one of said first and second parts to the automobile vehicle.

2. The guide according to claim 1, wherein at least one of the first and the second parts is formed from a vibration-absorbing material.

3. The guide of claim 1, wherein the second part has substantially the same dimensions as the first part.

4. The guide according to claim 1, wherein the first and second parts are connected together by a hinge.

5. The guide according to claim 4, further comprising a system for locking the first and second parts together in a retaining position.

6. A wiring harness comprising:

at least two separate guides, each guide comprising a first part having a guide channel, at least one branch being provided in the guide channel, a second part retaining cables in the guide channel, the second part compressing cables placed in the channel against the first part, a securing means provided in one of the first and second parts to connect said one of the first and second parts to the automobile vehicle; and a plurality of cables, each cable passing through at least one of the guides and being retained in the guide channel of the first part by the second part.

7. The wiring harness according to claim 6, wherein the second part is adapted to allow the cables to be selectively released from the guide channels.

8. The wiring harness according to claim 6, wherein at least one of the first and second parts is formed from a vibration-absorbent material.

9. The wiring harness according to claim 6, wherein the second part has substantially the same dimensions as the first part.

10. The wiring harness according to claim 6, wherein the first and second parts are connected together by a hinge.

11. The wiring harness of claim 10, wherein the guide further comprises a system for locking the first part to the second part in a retaining position.

* * * * *